United States Patent Office 3,267,020
Patented August 16, 1966

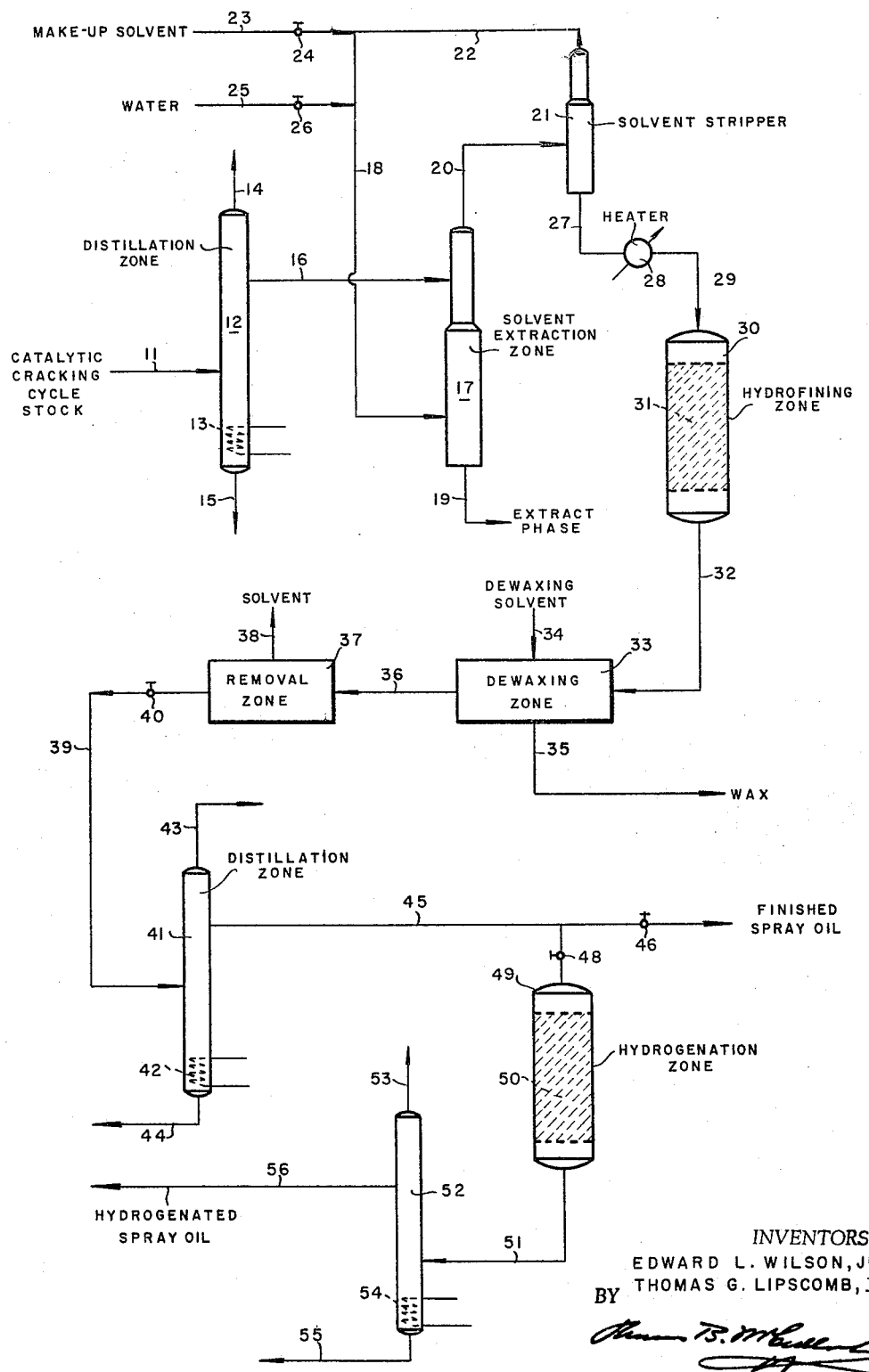

3,267,020
METHOD FOR PRODUCING SPRAY OIL
Edward L. Wilson, Jr. and Thomas G. Lipscomb II, Baytown, Tex., assignors, by mesne assignments, to Esso Research and Engineering Company, Elizabeth, N.J., a corporation of Delaware
Original application Oct. 22, 1962, Ser. No. 232,068, now Patent No. 3,227,609, dated Jan. 4, 1966. Divided and this application June 15, 1964, Ser. No. 375,194
4 Claims. (Cl. 208—28)

This application is a division of Serial No. 232,068, filed October 22, 1962 now Patent No. 3,227,609, entitled "Spray Oil," for Edward L. Wilson, Jr., and Thomas G. Lipscomb, II.

The present invention is directed to a spray oil. More particularly, the invention is concerned with a spray oil for application to fruit trees and the like. In its more specific aspects, the invention is concerned with an essentially saturated spray oil derived from a catalytic cracking cycle stock.

The present invention may be briefly described as an insecticidal spray oil consisting essentially of a saturated hydrocarbon fraction derived from catalytic cracking cycle stock. The fraction is comprised of hydrocarbons having molecular weights in the range from 260 to 380, and has an ASTM unsulfonated residue of at least about 95%. The hydrocarbon fraction has 10% distilling between about 360° F. to about 420° F., and 90% distilling between about 420° F. to about 520° F. as determined by the ASTM D-1160 method at 10 mm. pressure. The spray oil may suitably contain an oil-soluble emulsifying agent.

The present invention also involves a method for killing insects on fruit trees and the like which comprises applying to the fruit trees or other vegetation an emulsion of a spray oil, the spray oil consisting essentially of the saturated hydrocarbon fraction derived from catalytic cracking stock, the saturated hydrocarbon fraction comprised of hydrocarbons having molecular weights in the range from about 260 to 380 and an ASTM unsulfonated residue of at least about 95%.

The present invention also provides a method for producing a spray oil in which a selected fraction of catalytic cracking cycle stock is extracted with a solvent having a preferential selectivity for the relatively more aromatic type constituents as compared to the relatively more paraffinic type constituents under conditions to form a raffinate phase and an extract phase. The phases are separated and the raffinate phase, after removal of solvent, is subjected to catalytic hydrofining conditions to reduce the sulfur content to less than about 50 p.p.m. The hydrofined material is dewaxed and the spray oil is recovered from the dewaxed product. The dewaxed product may be hydrogenated in the presence of hydrogenation catalyst.

The term "catalytic cycle stock" as used herein is indicative of the fraction or fractions obtained in a catalytic cracking process having a boiling range above the gasoline range. In other words, in the operation of a catalytic cracking unit, a gaseous product, gasoline, catalytic cycle stock and a bottoms fraction are obtained. Characteristics of the catalytic cycle stock are an index of refraction measured at 67° C. within the range of about 1.4900 to about 1.5200 and a gravity within the range of about 17° to about 26° API (60° F.). Catalytic cycle stock, as described in the Wadley patent, U.S. 2,902,443, is a fraction of catalytic cycle stock which may boil in the range from about 670° F. to about 1015° F. and boiling substantially below about 900° F. Catalytic cracking recycle stock contains aromatics and paraffins, as well as noncondensed and condensed naphthenes and various aromatic sulfur-containing compounds.

The solvent extraction operation is suitably conducted by introducing the catalytic cracking stock fraction into the upper portion of an elongated column while solvent is introduced into the lower portion thereof. The cycle stock and solvent move countercurrently through the column, wherein effective contact between the countercurrently moving phases is generally secured by distributing and contacting means such as by bell cap trays, contact masses, distributing plates, pierced plates, and the like. Temperature and pressure conditions are maintained in the column by suitable means to secure the formation of an extract and a raffinate phase. The solvents used in the solvent extraction step, according to the present invention, have a preferential selectivity for the relatively more aromatic type constituents as compared to the relatively more paraffinic type constituents. Solvents which may be used in the present invention are, for example, phenol, furfural, sulfur dioxide, cresol, aniline, nitrobenzene, beta-betadichloroethyl ether (chlorex), and the like. Such solvents may be further modified with regard to selectivity and solvent power by the addition of inert solvents for example, by the addition of water, alcohols or glycols. Of these solvents, according to the present invention, phenol is preferred.

The solvent extraction of the catalytic cycle stock may be carried out at temperatures between about 120° F. and about 175° F., but preferably at a temperature in the range from about 140° F. to about 150° F. The solvent to catalytic cycle stock ratio may be in a range from about 0.5:1 to about 5:1. The preferred solvent to catalytic cycle stock ratio is 1:1. Such latter conditions are suitable where phenol is the solvent.

The dewaxing operation, in accordance with the present invention, may be conducted with several dewaxing solvents such as ketone-aromatic hydrocarbon mixtures as illustrated by methyl ethyl ketone-toluene mixtures, propane, and the like. As illustrative of the dewaxing solvents may be mentioned a solvent consisting of 65% methyl ethyl ketone and 35% toluene. Other solvents may also be used. Dewaxing temperatures may range for a ketone-aromatic solvent from about −15° F. to about +20° F. with solvent-to-oil ratios from about 1.0 to about 5.0. Preferred temperatures are within the range from about 0° F. to about 10° F., and a preferred solvent-to-oil ratio is about 2.7.

In the hydrofining operation, the preferred catalyst is cobalt molybdate on a suitable support such as alumina. Other hydrofining catalysts such as but not limited to molybdenum disulfide, nickel-molybdenum, nickel-cobalt molybdate, nickel-tungsten sulfide, and iron-cobalt molybdate deposited on suitable bases may be employed. Temperatures may range from about 500° F. to about 700° F. with preferred temperatures from about 600° F. to about 630° F. Pressures may range from about 600 to 1000 p.s.i. with preferred pressures within the range from about 650 to about 750 p.s.i. Space velocities may range from about 0.5 to about 3.0 v./v./hr. with preferred space velocities within the range from about 1 to about 2. Hydrogen is suitably employed in the hydrofining operation in the amount from about 100 to about 1000 s.c.f./bbl. with a preferred amount of hydrogen from about 500 to about 600 s.c.f./bbl.

The hydrogenation step is preferably conducted with a high nickel content catalyst such as one containing about 65% nickel on kieselguhr. Group VIII metals in elementary forms or the oxides thereof may be used in hydrogenation. As examples thereof but not limited thereto may be mentioned nickel, platinum, paladium, and rhodium. Specific examples include nickel on kieselguhr and platinum on alumina.

Hydrogenation temperatures may range from about 300° F. to about 600° F. with preferred temperatures in the range from about 450° F. to about 575° F. Pressures may range from about 600 to about 1000 p.s.i. with a preferred pressure from about 800 to about 950 p.s.i. Space velocities may range from about 0.1 to about 1.5 with a preferred space velocity from about 0.1 to about 0.5. Hydrogen is employed in an amount from about 300 to about 9000 s.c.f./bbl. with a preferred amount from about 750 to about 2000 s.c.f./bbl. of feed.

In employing the spray oil in killing insects, it is suitably applied by spraying in the form of an emulsion which readily breaks on deposition on the exposed surfaces of the vegetation. This emulsion suitably may contain from about 0.10% to about 6.0% by volume of the spray oil. A nonionic oil-soluble emulsifying agent is suitably included in the spray oil. As examples of the nonionic emulsifying agents may be mentioned the ethoxylated surface-active agents such as, but not limited to, the alkyl aryl polyether alcohols with a nonionic solubilizer, alkyl polyoxy ethylene glycols such as the product prepared by the alcohol-ethylene oxide addition reaction of tridecyl alcohol with ethylene oxide to yield a glycol with an average ethylene oxide chain length of 4 mols, sodium alkyl aryl sulfonates, tridecyl alcohol ethoxylate, oleic acid monoester of $C_{10}$ polyethylene glycol, octyl phenoxy polyethoxy ethanol with butyl alcohol as a coupling agent, polyoxyethylene alkyl aryl esters, monofatty or rosin acid esters of polyoxyethylene glycol, and the like. Other surface-active agents which are oil soluble and which allow the emulsion to break readily on deposition on fruit trees and the like may suitably be employed.

As a general statement, the properties of an emulsification agent to be used in citrus spray oil should be that the emulsifier is readily soluble in the spray oil in the amount of 0.25% to 1.0% by volume and it should remain in solution indefinitely. When 1% to 2% of the oil containing the emulsifier is stirred in water, the oil should be readily emulsified as an oil-in-water emulsion. The emulsion should break readily when it is sprayed on citrus foliage or fruit. Also, when 1% to 2% of the oil is agitated with water in a tall 4-oz. laboratory bottle, some separation of the oil and water should occur shortly after agitation. When 1% to 2% of the oil containing an emulsifier is agitated with water, foaming should not occur. It is desirable that the oil-emulsifier solution have a neutralization number of zero. Moreover, the emulsifier should be affected to a minimum by variations in water hardness or pH.

It is to be emphasized the spray oil of the present invention may be used in an emulsion, containing an emulsification agent or emulsified with water just prior to use with optional inclusion of an emulsifier. Also, the oil may be applied as a mist directly to the fruit trees or fruit although application as an emulsion may be preferred.

When the emulsion is sprayed on citrus fruit trees, it should readily break and deposit the oil thereon. In many areas it is preferred that this oil deposit be of about 150 micrograms of the oil per square centimeter on the surface of the citrus fruit trees and citrus fruit. Actually, the spray oil of the present invention is effective in somewhat smaller quantities and usually amounts not in excess of about 100 micrograms per square centimeter are usually effective in controlling insects which infest citrus trees when an emulsion containing 1.75% by volume of oil is applied. It is contemplated that the oil deposited on fruit trees will usually amount from about 1 microgram to about 80 micrograms per square centimeter.

The present invention will be further illustrated by reference to the drawing in which the single figure is a flow diagram of a preferred mode. Referring now to the drawing, numeral 11 designates a charge line by way of which a catalytic cracking cycle stock is introduced into the system from a catalytic cracking operation which may be of the fluidized bed type or of the disperse phase or transfer line reaction type. In any event, the cycle stock is introduced into a distillation zone 12, illustrated as a single distillation tower, but which may be a plurality of distillation towers. Zone 12 is provided with suitable internal vapor-liquid contacting means and other auxiliary means such as means for inducing reflux, condensing and cooling means, and the like. Zone 12 is provided with a heating means illustrated by a steam coil 13 for controlling temperatures and pressures. Line 14 is provided by way of which an overhead fraction is removed from zone 12, and line 15 by way of which a heavier fraction is discharged. A heart cut fraction is removed by line 16. It is this fraction from which the spray oil is manufactured. The heart cut fraction in line 16 is discharged thereby into a solvent extraction zone 17 into which there is introduced by way of line 18 a suitable solvent such as phenol. Conditions are adjusted in zone 17 for obtaining a raffinate phase and an extract phase. The extract phase is discharged by line 19 for removal of solvent and further processing as may be desired. The raffinate phase is discharged by line 20 into a solvent stripper 21 for removal of solvent from the raffinate phase by line 22 for recycling to line 18. Make-up solvent may be introduced by line 23, controlled by valve 24, and water may be added to line 18 by line 25, controlled by valve 26.

The solvent-free raffinate discharges by line 27 and is passed through a heater 28 for increasing the temperature of the raffinate to hydrofining temperatures. The heated raffinate discharges by line 29 into a hydrofining zone 30 containing a bed 31 of hydrofining catalyst such as 3.7% $CoO$ and 13.1% $MoO_3$ on alumina.

Under the conditions obtaining in zone 30, the raffinate is hydrofined to reduce its sulfur content to less than 50 p.p.m. The hydrofined product discharges from zone 30 by line 32 and after suitable cooling and fractionation to remove light products and treatment for removal of hydrogen sulfide, is discharged into a solvent dewaxing zone 33 into which there is introduced by way of line 34 a dewaxing solvent. Conditions in zone 33 are provided for precipitation of wax which is discharged by line 35.

The dewaxed oil discharges from zone 33 by line 36 into a solvent removal zone 37 with solvent being discharged therefrom by line 38. The dewaxed oil then discharges by line 39, controlled by valve 40, into a distillation zone 41, which may be similar to distillation zone 12, and may comprise several towers. For purposes of simplicity, zone 41 is shown as a single tower provided with a heating means illustrated by steam coil 42 for adjustment of temperatures and pressures. Light fractions may be removed from the dewaxed oil by line 43 and any heavy fractions may be discharged by line 44. The finished spray oil is withdrawn by line 45 and may be sent to tankage by opening valve 46 to communicate therewith. It may be desirable to hydrogenate at least part of the spray oil and to this end line 47, controlled by valve 48, discharges the spray oil into a hydrogenation zone 49 containing a bed 50 of hydrogenation catalyst such as illustrated. On passage of the spray oil through zone 49, any deleterious substances may be removed and the hydrogenated product is discharged by line 51 and introduced thereby into a distillation zone 52 which is similar to distillation zones 41 and 12. Light fractions are suitably withdrawn overhead by line 53 and adjustment of temperatures and pressures is controlled with heating means such as steam coil 54. Heavy fractions are withdrawn from zone 52 by line 55 while the hydrogenated spray oil is withdrawn by line 56.

It must be emphasized that the spray oils withdrawn by line 45 and line 56 are equivalent in killing insects on fruit trees. However, in the interest of removing any detrimental substances from the spray oil, it may be preferred to hydrogenate same and recover the spray oil by way of line 56.

In order to illustrate the invention further, a distillate from catalytic cycle stock was subjected to solvent extraction with phenol to obtain a raffinate. This raffinate was then hydrofined and dewaxed to obtain a spray oil. Typical inspections of two runs, in accordance with the present invention, are included in Table I which follows:

and eggs of the citrus red mite [*Panonychus citri* (McG.)] which infest citrus trees. An emulsion of the spray oil with water was made up employing an oil-soluble emulsifying agent of the type illustrated.

Tables II through VIII illustrate the data obtained in determining LD–95 values for spray oils from catalytic

TABLE I

|  | Catalytic cycle stock | | Raffinate | | Hydrofined raffinate | | Dewaxed spray oil | |
|---|---|---|---|---|---|---|---|---|
| Gravity, °API | 24.0 | 24.1 | 38.0 | 38.0 | 37.2 | 37.9 | 34.8 | 34.8 |
| Refractive index, Nd at 60° C | 1.4994 | 1.5008 | 1.4428 | 1.4434 | 1.4444 | 1.4432 | 1.4504 | 1.4502 |
| Viscosity: | | | | | | | | |
| SSU at 100° F | 74.2 | 73.1 | 64.9 | 63.4 | 65.9 | 65.5 | 74.8 | 73.7 |
| SSU at 210° F | 36.6 | 36.4 | 36.4 | 36.1 | 36.4 | 36.4 | 37.1 | 37.0 |
| Color, TR | 17¾ | 1½ | 18¼ | 21¼ | 17½ | 18¼ | 17+ | 17½ |
| Colorhold, TR | 3/16 | ½ | 17¾ | 20¼ | 17½ | 18¼ | 17+ | 17½ |
| Flash: | | | | | | | | |
| OC, °F | 360 | 355 | 385 | 380 | 380 | 365 | 380 | 350 |
| PM, °F | | | | | 375 | 340 | 370 | 360 |
| Wax content, SBA, wt. percent | 19.6 | 18.5 | 32.7 | 30.6 | 22.6 | 28.6 | 0.082 | 0.40 |
| Aromatics | 39.2 | 39.1 | 4.7 | 5.0 | 6.4 | 5.7 | 8.8 | 8.3 |
| Bromine No | | | | | 0.47 | 1.42 | 1.06 | 0.39 |
| Aniline point, °F | 177 | 172 | 222 | 221 | 219 | 221 | 213 | 212 |
| Unsulfonated residue: | | | | | | | | |
| ASTM | | | 96 | 96 | 94 | 97 | 98 | 97 |
| AOAC | | | 93 | 93 | 95 | 94 | 94 | 91 |
| Conradson carbon, wt. percent | | | | | 0 | 0 | 0 | 0 |
| Carbon } Ratio | | | | | 85.5 | 85.4 | 85.4 | 85.0 |
| Hydrogen } | | | | | 14.3 | 14.4 | 14.3 | 14.0 |
| Nickel (Wet Ash), p.p.m | | | | | <0.20 | <0.20 | <0.20 | <0.20 |
| Nitrogen | | | | | 0 | 0.01 | 0 | 0 |
| Neutralization No | | | | | Neut. | 0.011 | Neut. | Neut. |
| Sulfur, wt. percent | 0.60 | 0.49 | 0.037 | 0.046 | 0.01 | 0 | 0.012 | <0.01 |
| Corrosion, 3 hrs. at 212° F | J–4 | J–4 | J–4 | J–5 | J–4 | J–4 | J–4 | J–5 |
| ASTM Distillation, 10 mm. D–1160: | | | | | | | | |
| FBP | 529 | 527 | 538 | 536 | 543 | 551 | 540 | 520 |
| Recovery, percent | 99 | 98.0 | 98.0 | 98.0 | | | | |
| 5% off at °F | 386 | 391 | 405 | 384 | 396 | 418 | 394 | 371 |
| 10% off at °F | 403 | 406 | 420 | 403 | 415 | 433 | 405 | 399 |
| 20% off at °F | 418 | 419 | 433 | 423 | 433 | 445 | 424 | 418 |
| 30% off at °F | 428 | 427 | 442 | 438 | 443 | 455 | 436 | 430 |
| 40% off at °F | 435 | 436 | 453 | 448 | 449 | 466 | 444 | 441 |
| 50% off at °F | 443 | 445 | 461 | 457 | 457 | 472 | 453 | 451 |
| 60% off at °F | 452 | 454 | 469 | 463 | 466 | 483 | 467 | 461 |
| 70% off at °F | 463 | 462 | 478 | 470 | 474 | 490 | 477 | 471 |
| 80% off at °F | 474 | 476 | 488 | 481 | 486 | 502 | 490 | 481 |
| 90% off at °F | 489 | 489 | 503 | 498 | 503 | 516 | 504 | 497 |
| 95% off at °F | 503 | 498 | 522 | 515 | 521 | 533 | 510 | 506 |
| Average Molecular Weight | | | | | | | 328 | 325 |

While the inspections in Table I are illustrative, the invention is not to be limited to spray oils of these particular characteristics. Actually, it is contemplated that the spray oil may be comprised of hydrocarbons having a molecular weight in the range from about 260 to about 380 and having an unsulfonated residue by the ASTM method of at least about 95%. Likewise, it is contemplated that the ASTM distillation D–1160 method at 10 mm. pressure may be such that the oil has 10% distilling at a temperature in the range between about 360° F. and about 420° F., and 90% distilling at a temperature in the range between about 420° F. and about 520° F. The unsulfonated residue, as measured by the ASTM tests, should be at least about 95%; however, spray oils, in accordance with the present invention, ordinarily have unsulfonated residues ranging from about 97% to about 99%. The viscosity of the spray oil at 100° F. SSU may range from about 40 to about 105; whereas, the viscosity at 210° F. may be from about 1.60 centistokes to about 40 SSU.

In order to illustrate the invention further, laboratory tests were made with spray oils from catalytic cycle stock having varying molecular weights where the spray oil was obtained without hydrogenation and where the spray oil was treated by hydrogenation. Tests were made utilizing widely accepted procedures as described in publications by Riehl and La Due (1952) and Riehl et al. (1953) on California red scale [*Aonidiella aurantii* (Mask.)] stock against California red scale. LD–95 is a term well known in the field of entomology which means the lethal dose in micrograms of oil required per square centimeter of plant and/or fruit surface to kill 95% of the exposed scale or eggs.

The LD–95 values shown in Tables II through VIII as well as in subsequent tables have been determined by the Probit Analysis procedure. The Probit Analysis procedure is a statistical treatment of the data obtained in entomological experimentation which is well known in the literature and which may be found in the text by D. J. Finney entitled "Probit Analysis" published in 1947 by the University Press, Cambridge.

It will be seen that LD–95 values for the spray oil in the lower range of molecular weights (280 to 285) were larger than the LD–95 values for oils having average molecular weights in the 300 to 360 range, indicating that the oils of higher molecular weight are more efficient against California red scale.

A comparison of the efficiency of spray oils from catalytic cycle stock with that of oils from conventional paraffinic stock is given in Table XV. It will be seen that the LD–95 values of spray oils from catalytic cycle stock of 300 or higher average molecular weight are lower than the LD–95 values for the corresponding conventional oils, thus showing greater efficiency for the catalytic cycle stocks against California red scale.

TABLE II
*Emulsified 280 M.W. nickel hydrogenated spray oil from catalytic cycle stock*

[California red scale]

| | Total number units counted | Oil deposit, micrograms per sq. cm. | Number units dead | Percent kill | |
|---|---|---|---|---|---|
| | | | | Observed | Abbott corrected |
| Treated | 204 | 19.61 | 54 | 26.47 | 23.10 |
| | 188 | 31.79 | 56 | 29.79 | 26.57 |
| | 127 | 32.33 | 29 | 22.83 | 19.29 |
| | 293 | 39.63 | 144 | 49.15 | 46.82 |
| | 233 | 39.72 | 91 | 29.06 | 36.27 |
| | 243 | 47.89 | 187 | 76.95 | 75.89 |
| | 191 | 49.80 | 101 | 52.88 | 50.72 |
| | 223 | 57.36 | 144 | 64.57 | 62.95 |
| | 219 | 60.60 | 136 | 62.10 | 60.36 |
| | 257 | 69.46 | 195 | 75.88 | 74.78 |
| | 165 | 72.16 | 123 | 74.55 | 73.38 |
| | 238 | 73.99 | 212 | 89.08 | 88.58 |
| | 201 | 76.78 | 174 | 86.57 | 85.95 |
| Untreated | 251 | | 11 | 4.38 | |

LD-95 in micrograms of oil/sq. cm. of fruit surface: 128.2.
95% confidence limits of LD-95: 114.2 to 143.9.
Probit analysis regression equation: Y=5.21+3.50X.
Standard error of coefficient of X=0.19.
NOTE:
  Y=Probit value for percent mortality.
  =Log₁₀ of oil deposit in micrograms of oil per sq. cm. of fruit surface.

TABLE III
*Emulsified 285 M.W. spray oil from catalytic cycle stock*

[California red scale]

| | Total number units counted | Oil deposit, micrograms per sq. cm. | Number units dead | Percent kill | |
|---|---|---|---|---|---|
| | | | | Observed | Abbott corrected |
| Treated | 265 | 26.46 | 160 | 60.38 | 54.97 |
| | 261 | 28.45 | 75 | 28.74 | 19.01 |
| | 278 | 29.38 | 76 | 27.34 | 17.42 |
| | 205 | 29.44 | 145 | 70.73 | 66.73 |
| | 150 | 37.17 | 120 | 80.00 | 77.27 |
| | 214 | 40.25 | 189 | 88.32 | 86.73 |
| | 246 | 49.05 | 205 | 83.33 | 81.05 |
| | 218 | 50.82 | 168 | 77.06 | 73.93 |
| | 221 | 62.10 | 203 | 91.86 | 90.75 |
| | 222 | 63.45 | 188 | 84.68 | 82.59 |
| | 255 | 69.84 | 238 | 93.33 | 92.42 |
| | 185 | 74.64 | 179 | 96.76 | 96.32 |
| Untreated | 308 | | 37 | 12.01 | |

LD-95 in micrograms of oil/sq. cm. of fruit surface: 77.2.
95% confidence limits of LD-95: 71.1 to 83.7.
Probit analysis regression equation: Y=5.42+4.24X.
Standard error of coefficient of X=0.21.
NOTE:
  Y=Probit value for percent mortality.
  X=Log₁₀ of oil deposit in micrograms of oil per sq. cm. of fruit surface.

TABLE IV
*Emulsified 300 M.W. nickel hydrogenated spray oil from catalytic cycle stock*

[California red scale]

| | Total number units counted | Oil deposit, micrograms per sq. cm. | Number units dead | Percent kill | |
|---|---|---|---|---|---|
| | | | | Observed | Abbott corrected |
| Treated | 129 | 23.65 | 54 | 41.86 | 38.38 |
| | 345 | 23.73 | 189 | 54.78 | 52.07 |
| | 144 | 27.17 | 88 | 61.11 | 58.78 |
| | 184 | 33.65 | 112 | 60.87 | 58.53 |
| | 235 | 36.97 | 219 | 93.19 | 92.78 |
| | 249 | 45.54 | 243 | 97.59 | 97.45 |
| | 171 | 48.47 | 164 | 95.91 | 95.67 |
| | 182 | 49.53 | 179 | 98.35 | 98.25 |
| | 254 | 52.79 | 253 | 99.61 | 99.59 |
| | 187 | 66.82 | 186 | 99.47 | 99.44 |
| | 355 | 71.27 | 353 | 99.44 | 99.41 |
| Untreated | 283 | | 16 | 5.65 | |

LD-95 in micrograms of oil/sq. cm. of fruit surface: 45.4.
95% confidence limits of LD-95: 43.1 to 47.8.
Probit analysis regression equation: Y=5.64+6.28X.
Standard error of Coefficient of X=0.31.
NOTE:
  Y=Probit value for percent mortality.
  X=Log₁₀ of oil deposit in micrograms of oil per sq. cm. of fruit surface.

TABLE V
*Emulsified 305 M.W. spray oil from catalytic cycle stock*

[California red scale]

| | Total number units counted | Oil deposit, micrograms per sq. cm. | Number units dead | Percent kill | |
|---|---|---|---|---|---|
| | | | | Observed | Abbott corrected |
| Treated | 328 | 19.94 | 107 | 32.62 | 30.53 |
| | 263 | 22.37 | 87 | 33.08 | 31.05 |
| | 280 | 22.65 | 143 | 51.07 | 49.59 |
| | 261 | 24.12 | 135 | 51.72 | 50.26 |
| | 273 | 24.37 | 163 | 59.71 | 58.49 |
| | 315 | 33.81 | 252 | 80.00 | 79.39 |
| | 174 | 34.31 | 152 | 87.36 | 86.98 |
| | 216 | 41.45 | 210 | 97.22 | 97.14 |
| | 271 | 43.31 | 245 | 90.41 | 90.12 |
| | 186 | 53.43 | 180 | 96.77 | 96.67 |
| Untreated | 306 | | 9 | 2.94 | |

LD-95 in micrograms of oil/sq. cm. of fruit surface: 45.3.
95% confidence limits of LD-95: 42.7 to 48.1.
Probit analysis regression equation: Y=5.26+5.95X.
Standard error of coefficient of X=0.26.
NOTE:
  Y=Probit value for percent mortality.
  X=Log₁₀ of oil deposit in micrograms of oil per sq. cm. of fruit surface.

TABLE VI
*Emulsified 320 M.W. nickel hydrogenated spray oil from catalytic cycle stock*

[California red scale]

| | Total number units counted | Oil deposit, micrograms per sq. cm. | Number units dead | Percent kill | |
|---|---|---|---|---|---|
| | | | | Observed | Abbott corrected |
| Treated | 306 | 14.96 | 126 | 41.18 | 37.97 |
| | 219 | 15.41 | 48 | 21.92 | 17.65 |
| | 227 | 21.11 | 112 | 49.34 | 46.57 |
| | 271 | 21.94 | 130 | 47.97 | 45.13 |
| | 195 | 31.47 | 90 | 46.15 | 43.21 |
| | 169 | 32.98 | 112 | 66.27 | 64.43 |
| | 260 | 39.03 | 194 | 74.62 | 73.23 |
| | 229 | 39.38 | 164 | 71.62 | 70.07 |
| | 372 | 42.28 | 345 | 92.74 | 92.34 |
| | 197 | 43.44 | 177 | 89.85 | 89.30 |
| | 187 | 44.51 | 184 | 98.40 | 98.31 |
| | 286 | 49.49 | 259 | 90.56 | 90.04 |
| Untreated | 251 | | 13 | 5.18 | |

LD-95 in micrograms of oil/sq. cm. of fruit surface: 65.4.
95% confidence limits of LD-95: 59.9 to 71.3.
Probit analysis regression equation: Y=5.37+3.69X.
Standard error of coefficient of X=0.18.
NOTE:
  Y=Probit value for percent mortality.
  X=Log₁₀ of oil deposit in micrograms of oil per sq. cm. of fruit surface.

TABLE VII
*Emulsified 340 M.W. nickel hydrogenated spray oil from catalytic cycle stock*

[California red scale]

| | Total number units counted | Oil deposit, micrograms per sq. cm. | Number units dead | Percent kill | |
|---|---|---|---|---|---|
| | | | | Observed | Abbott corrected |
| Treated | 213 | 14.16 | 65 | 30.52 | 27.59 |
| | 273 | 15.11 | 80 | 29.30 | 26.32 |
| | 178 | 25.39 | 148 | 83.15 | 82.44 |
| | 217 | 27.97 | 128 | 58.99 | 57.26 |
| | 223 | 35.78 | 198 | 88.79 | 88.32 |
| | 264 | 37.27 | 242 | 91.67 | 91.32 |
| | 213 | 43.43 | 199 | 93.43 | 93.15 |
| | 226 | 45.05 | 209 | 92.48 | 92.16 |
| | 260 | 52.71 | 255 | 98.08 | 98.00 |
| | 244 | 60.90 | 243 | 99.59 | 99.57 |
| Untreated | 296 | | 12 | 4.05 | |

LD-95 in micrograms of oil/sq. cm. of fruit surface: 46.4.
95% confidence limits of LD-95: 43.3 to 49.7.
Probit analysis regression equation: Y=5.56+4.56X.
Standard error of coefficient of X=0.20.
NOTE:
  Y=Probit value for percent mortality.
  X=Log₁₀ of oil deposit in micrograms of oil per sq. cm. of fruit surface.

TABLE VIII

*Emulsified 360 M.W. nickel hydrogenated spray oil from catalytic cycle stock*

[California red scale]

| | Total number units counted | Oil deposit, micrograms per sq. cm. | Number units dead | Percent kill | |
|---|---|---|---|---|---|
| | | | | Observed | Abbott corrected |
| Treated.... | 363 | 25.22 | 102 | 28.10 | 24.74 |
| | 278 | 26.26 | 148 | 53.24 | 51.06 |
| | 326 | 29.46 | 205 | 62.88 | 61.15 |
| | 248 | 29.94 | 197 | 79.44 | 78.48 |
| | 394 | 30.73 | 268 | 68.02 | 66.53 |
| | 328 | 30.96 | 195 | 59.45 | 57.56 |
| | 305 | 38.40 | 233 | 76.39 | 75.29 |
| | 353 | 39.90 | 334 | 94.62 | 94.37 |
| | 314 | 44.41 | 298 | 94.90 | 94.66 |
| | 184 | 49.27 | 181 | 98.37 | 98.29 |
| | 280 | 49.61 | 266 | 95.00 | 94.77 |
| | 239 | 50.83 | 232 | 97.07 | 96.93 |
| Untreated.. | 202 | ------------ | 9 | 4.46 | ------------ |

LD-95 in micrograms of oil/sq. cm. of fruit surface: 45.9.
95% confidence limits of LD-95: 44.2 to 47.6.
Probit analysis regression equation: $Y = 5.48 + 7.45X$.
Standard error of coefficient of $X = 0.31$.
NOTE:
$Y$ = Probit value for percent mortality.
$X$ = $\text{Log}_{10}$ of oil deposit in micrograms of oil per sq. cm. of fruit surface.

Table IX lists data from laboratory spray trials with the unhydrogenated spray oil of 305 average molecular weight, which were conducted to determine LD-95 values against citrus red mite eggs. As may be seen from the very low LD-95 value obtained, this oil is very efficient against citrus red mite eggs.

TABLE IX

*Emulsified 305 M.W. spray oil from catalytic cycle stock*

[Citrus red mite eggs]

| | Total number units counted | Oil deposit, micrograms per sq. cm. | Number units dead | Percent kill | |
|---|---|---|---|---|---|
| | | | | Observed | Abbott corrected |
| Treated.... | 345 | 1.15 | 230 | 66.67 | 64.96 |
| | 359 | 1.16 | 205 | 57.10 | 54.89 |
| | 378 | 2.14 | 287 | 75.93 | 74.69 |
| | 314 | 2.50 | 229 | 72.93 | 71.54 |
| | 404 | 4.39 | 395 | 97.77 | 97.66 |
| | 434 | 5.40 | 404 | 93.09 | 92.73 |
| | 362 | 5.75 | 344 | 95.03 | 94.77 |
| | 297 | 8.23 | 290 | 97.64 | 97.52 |
| | 338 | 8.37 | 325 | 96.15 | 95.95 |
| | 331 | 8.81 | 318 | 96.07 | 95.87 |
| | 318 | 9.62 | 312 | 98.11 | 98.01 |
| | 325 | 11.77 | 312 | 96.00 | 95.79 |
| | 351 | 13.32 | 350 | 99.72 | 99.71 |
| | 356 | 13.44 | 348 | 97.75 | 97.63 |
| Untreated.. | 470 | ------------ | 23 | 4.89 | ------------ |

LD-95 in micrograms of oil/sq. cm. of fruit surface: 6.7.
95% confidence limits of LD-95: 6.1 to 7.5.
Probit analysis regression equation: $Y = 6.01 + 1.86X$.
Standard error of coefficient of $X = 0.08$.
NOTE:
$Y$ = Probit value for percent mortality.
$X$ = $\text{Log}_{10}$ of oil deposit in micrograms of oil per sq. cm. of fruit surface.

Tables X through XIV list data obtained in the determination of LD-95 values for nickel hydrogentaed spray oils from catalytic cycle stock against citrus red mite eggs. Again, it will be seen that the oil having the lower average molecular weight is less efficient, as shown by a higher LD-95 value, than the oils having molecular weights in the preferred range from about 300 to 320 and above.

Again, a comparison of the efficiency of the spray oils from catalytic cycle stock with that of oils from conventional paraffinic stock, as shown in Table XV, shows the catalytic stocks of 300 and above average molecular weight to be more efficient than the corresponding conventionally produced oils. In the case of efficiency against citrus red mite, the advantage of the catalytic cycle oils is more pronounced than was noted against California red scale.

TABLE X

*Emulsified 280 M.W. nickel hydrogenated spray oil from catalytic cycle stock*

[Citrus red mite eggs]

| | Total number units counted | Oil deposit, micrograms per sq. cm. | Number units dead | Percent kill | |
|---|---|---|---|---|---|
| | | | | Observed | Abbott corrected |
| Treated.... | 239 | 10.04 | 88 | 36.82 | 33.50 |
| | 215 | 11.07 | 109 | 50.70 | 48.11 |
| | 143 | 13.89 | 55 | 38.46 | 35.23 |
| | 211 | 14.74 | 141 | 66.82 | 65.08 |
| | 217 | 15.45 | 105 | 48.39 | 45.68 |
| | 123 | 17.01 | 64 | 52.03 | 49.51 |
| | 185 | 18.68 | 94 | 50.81 | 48.23 |
| | 299 | 22.16 | 257 | 85.95 | 85.21 |
| | 193 | 24.33 | 117 | 60.62 | 58.55 |
| | 278 | 26.81 | 236 | 84.89 | 84.10 |
| | 187 | 41.46 | 142 | 75.94 | 74.68 |
| | 166 | 45.51 | 107 | 64.46 | 62.59 |
| | 229 | 45.98 | 215 | 93.89 | 93.57 |
| | 267 | 54.09 | 260 | 97.38 | 97.24 |
| Untreated.. | 381 | ------------ | 19 | 4.99 | ------------ |

LD-95 in micrograms of oil/sq. cm. of fruit surface: 80.1.
95% confidence limits of LD-95: 67.3 to 95.2.
Probit analysis regression equation: $Y = 5.38 + 2.17X$.
Standard error of coefficient of $X = 0.12$.

NOTE:
$Y$ = Probit value for percent mortality.
$X$ = $\text{Log}_{10}$ of oil deposit in micrograms of oil per sq. cm. of fruit surface.

TABLE XI

*Emulsified 300 M.W. nickel hydrogenated spray oil from catalytic cycle stock*

[Citrus red mite eggs]

| | Total number units counted | Oil deposit, micrograms per sq. cm. | Number units dead | Percent kill | |
|---|---|---|---|---|---|
| | | | | Observed | Abbott corrected |
| Treated.... | 227 | 1.25 | 67 | 29.52 | 25.47 |
| | 267 | 1.61 | 96 | 35.96 | 32.28 |
| | 215 | 2.16 | 98 | 45.58 | 42.45 |
| | 263 | 4.08 | 138 | 52.47 | 49.74 |
| | 219 | 4.24 | 173 | 79.00 | 77.79 |
| | 234 | 4.83 | 172 | 73.50 | 71.98 |
| | 196 | 6.00 | 181 | 92.35 | 91.91 |
| | 216 | 6.43 | 192 | 88.89 | 88.25 |
| | 262 | 7.51 | 203 | 77.48 | 76.18 |
| | 166 | 7.52 | 165 | 99.40 | 99.37 |
| | 227 | 9.00 | 223 | 98.24 | 98.14 |
| | 207 | 12.32 | 194 | 93.72 | 93.36 |
| Untreated.. | 294 | ------------ | 16 | 5.44 | ------------ |

LD-95 in micrograms of oil/sq. cm. of fruit surface: 12.2.
95% confidence limits of LD-95: 10.6 to 14.0.
Probit analysis of regression equation: $Y = 5.41 + 2.45X$.
Standard error of coefficient of $X = 0.12$.
NOTE:
$Y$ = Probit value for percent mortality.
$X$ = $\text{Log}_{10}$ of oil deposit in micrograms of oil per sq. cm. of fruit surface.

TABLE XII

*Emulsified 320 M.W. nickel hydrogenated spray oil from catalytic cycle stock*

[Citrus red mite eggs]

| | Total number units counted | Oil deposit, micrograms per sq. cm. | Number units dead | Percent kill | |
|---|---|---|---|---|---|
| | | | | Observed | Abbott corrected |
| Treated | 309 | 0.87 | 205 | 66.34 | 63.93 |
| | 237 | 1.12 | 104 | 43.88 | 39.86 |
| | 283 | 1.17 | 147 | 51.94 | 48.50 |
| | 189 | 2.07 | 132 | 69.84 | 67.68 |
| | 232 | 2.41 | 154 | 66.38 | 63.97 |
| | 293 | 2.99 | 258 | 88.05 | 87.19 |
| | 228 | 3.58 | 189 | 82.89 | 81.67 |
| | 259 | 4.88 | 243 | 93.82 | 93.38 |
| | 364 | 5.34 | 352 | 96.70 | 96.46 |
| | 209 | 6.04 | 193 | 92.34 | 91.79 |
| | 247 | 6.36 | 242 | 97.98 | 97.84 |
| Untreated | 449 | | 30 | 6.68 | |

LD-95 in micrograms of oil/sq. cm. of fruit surface: 8.4.
95% confidence limits of LD-95: 6.7 to 10.5.
Probit analysis regression equation: $Y=5.77+1.49X$.
Standard error of coefficient of $X=0.10$.

NOTE:
$Y$ = Probit value for percent mortality.
$X$ = $Log_{10}$ of oil deposit in micrograms of oil per sq. cm. of fruit surface.

TABLE XIV

*Emulsified 360 M.W. nickel hydrogenated spray oil from catalytic cycle stock*

[Citrus red mite eggs]

| | Total number units counted | Oil deposit, micrograms per sq. cm. | Number units dead | Percent kill | |
|---|---|---|---|---|---|
| | | | | Observed | Abbott corrected |
| Treated | 167 | 0.03 | 92 | 55.09 | 53.07 |
| | 210 | 0.03 | 122 | 58.10 | 56.21 |
| | 208 | 0.03 | 140 | 67.31 | 65.84 |
| | 177 | 0.31 | 153 | 86.44 | 85.83 |
| | 234 | 1.79 | 195 | 83.33 | 82.58 |
| | 193 | 1.91 | 180 | 93.26 | 92.96 |
| | 290 | 3.10 | 280 | 96.55 | 96.39 |
| | 224 | 3.45 | 211 | 94.20 | 93.94 |
| | 185 | 4.34 | 179 | 96.76 | 96.61 |
| | 226 | 4.83 | 222 | 98.23 | 98.15 |
| | 204 | 5.20 | 202 | 99.02 | 98.98 |
| Untreated | 325 | | 14 | 4.31 | |

LD-95 in micrograms of oil/sq. cm. of fruit surface: 3.6.
95% confidence limits of LD-95: 2.3 to 5.6.
Probit analysis regression equation: $Y=5.86+0.69X$.
Standard Error of coefficient of $X=0.04$.

NOTE:
$Y$ = Probit value for percent mortality.
$X$ = $Log_{10}$ of oil deposit in micrograms of oil per sp. cm. of fruit surface.

TABLE XV

*Comparison of spray oils produced in accordance with present invention and prior art spray oils*

| Oil | Average molecular weight | Distillation data at 10 mm., ° F. | | | Vis. at 100° F., SSU | LD-95, micrograms oil/sq. cm. | |
|---|---|---|---|---|---|---|---|
| | | 10% | 90% | 10-90% range | | Citrus red mite eggs | California red scale |
| Catalytic cycle stock | 285 | 383 | 393 | 10 | 52.8 | | 77.2 |
| | 305 | 403 | 431 | 28 | 59.3 | 6.7 | 45.3 |
| Nickel hydrogenated catalytic cycle stock | 280 | 356 | 382 | 26 | 50.4 | 80.1 | 128.2 |
| | 300 | 401 | 415 | 14 | 60.9 | 12.2 | 45.4 |
| | 320 | 423 | 431 | 8 | 67.7 | 8.4 | 65.4 |
| | 340 | 447 | 454 | 7 | 76.8 | 11.5 | 46.4 |
| | 360 | 472 | 479 | 7 | 90.5 | 3.6 | 45.9 |
| Conventionally produced spray oils [1] | 275 | 356 | 386 | 30 | 47.2 | [2] n.e. | 89 |
| | 290 | 377 | 410 | 33 | 52.4 | 69 | 85 |
| | 312 | 398 | 429 | 31 | 58.9 | 34 | 69 |
| | 323 | 417 | 447 | 30 | 67.0 | 29 | 85 |
| | 337 | 437 | 467 | 30 | 76.7 | 26 | 75 |
| | 354 | 452 | 482 | 30 | 90.2 | 21 | 64 |
| | 376 | 471 | 501 | 30 | 110.7 | 24 | 77 |

[1] Data from papers by G. W. Pearce and P. J. Chapman of New York State Agricultural Experiment Station and by L. A. Riehl and J. P. LaRue, University of California Citrus Experiment Station, published in "American Chemical Society Advances in Chemistry," Series No. 7 (1952).
[2] Noneffective at all concentrations tested.

TABLE XIII

*Emulsified 340 M.W. nickel hydrogenated spray oil from catalytic cycle stock*

[Citrus red mite eggs]

| | Total number units counted | Oil deposit, micrograms per sq. cm. | Number units dead | Percent kill | |
|---|---|---|---|---|---|
| | | | | Observed | Abbott corrected |
| Treated | 278 | 0.33 | 220 | 79.14 | 77.51 |
| | 323 | 0.33 | 243 | 75.23 | 73.30 |
| | 310 | 0.43 | 279 | 90.00 | 89.22 |
| | 189 | 0.60 | 177 | 93.65 | 93.16 |
| | 336 | 2.51 | 299 | 88.99 | 88.13 |
| | 248 | 4.54 | 232 | 93.55 | 93.05 |
| | 350 | 5.22 | 332 | 94.86 | 94.46 |
| | 269 | 6.05 | 264 | 98.14 | 98.00 |
| | 262 | 7.46 | 259 | 98.85 | 98.76 |
| | 293 | 10.42 | 258 | 88.05 | 87.12 |
| Untreated | 346 | | 25 | 7.23 | |

LD-95 in micrograms of oil/sq. cm. of fruit surface: 11.5.
95% confidence limits of LD-95: 5.5 to 23.8.
Probit analysis regression equation: $Y=6.16+0.50X$.
Standard error of coefficient of $X=0.06$.

NOTE:
$Y$ = Probit value for per cent mortality.
$X$ = $Log_{10}$ of oil deposit in micrograms of oil per sq. cm. of fruit surface.

Of further significance with respect to the unique and superior qualities of spray oils from catalytic cycle stock is that these oils have excellent pesticidal efficiency while causing no acute injury to citrus trees. This was demonstrated in a field application of a nickel hydrogenated catalytic spray oil similar to the oil described herein as having about 300 average molecular weight. This oil was sprayed on navel orange trees in southern California in the amount of 30 to 35 gallons of spray mixture per tree of average 14-foot height. After a period of several weeks, no damage to the trees was noted.

As stated, the spray oil of the present invention is applied to fruit trees in the form of an emulsion by spraying the fruit trees and the like with the emulsion. The emulsion breaks on deposition on the surfaces of the fruit trees allowing the oil to be deposited thereon with the water dropping off.

The invention is quite important and useful in that improved results are obtained in controlling insects on vegetation, particularly, on fruit trees. Heretofore, oils of this nature have not been applied to fruit trees or other vegetation. Likewise, oils giving the kills obtained with the present invention with the given amount of deposit have not been obtainable. Indeed, it is quite surprising that such small amounts of oil deposits would be effective in controlling insects on fruit trees and the like.

The nature and objects of the present invention, having been completely described and illustrated and the best mode thereof set forth, what we wish to claim as new and useful and secure by Letters Patent is:

1. A method for producing a spray oil which comprises extracting a catalytic cracking cycle stock having 10% distilling between about 360° F. to 420° F. and 90% distilling between about 420° F. to 520° F. as determined by the ASTM D-1160 method at 10 mm. pressure with a solvent having a preferential selectivity for aromatic constituents as compared to paraffinic constituents to form a raffinate phase and an extract phase, separating said phases, hydrofining said raffinate phase after removal of solvent therefrom, dewaxing said hydrofined raffinate phase, and recovering saturated spray oil from said dewaxed hydrofined raffinate phase consisting essentially of a hydrocarbon fraction having a molecular weight within the range from about 300 to about 380 and having an ASTM unsulfonated residue of at least about 95%.

2. A method in accordance with claim 1 in which the dewaxed hydrofined raffinate is subjected to hydrogenation prior to recovery of said spray oil.

3. A method in accordance with claim 2 in which the reaffinate phase is hydrofined in the presence of a cobalt molybdate catalyst to a sulfur content less than about 50 p.p.m. and the dewaxed raffinate phase is hydrogenated in the presence of a nickel catalyst.

4. A method in accordance with claim 1 in which the solvent is phenol.

References Cited by the Examiner

UNITED STATES PATENTS

| | | | |
|---|---|---|---|
| 2,361,080 | 10/1944 | Bolt et al. | 208—15 |
| 2,660,553 | 11/1953 | Knox | 208—96 |
| 3,001,932 | 9/1961 | Pietsch | 208—211 |
| 3,006,843 | 10/1961 | Archibald | 208—211 |

FOREIGN PATENTS

| | | |
|---|---|---|
| 553,540 | 2/1958 | Canada. |

DELBERT E. GANTZ, *Primary Examiner.*

H. LEVINE, *Examiner.*